UNITED STATES PATENT OFFICE.

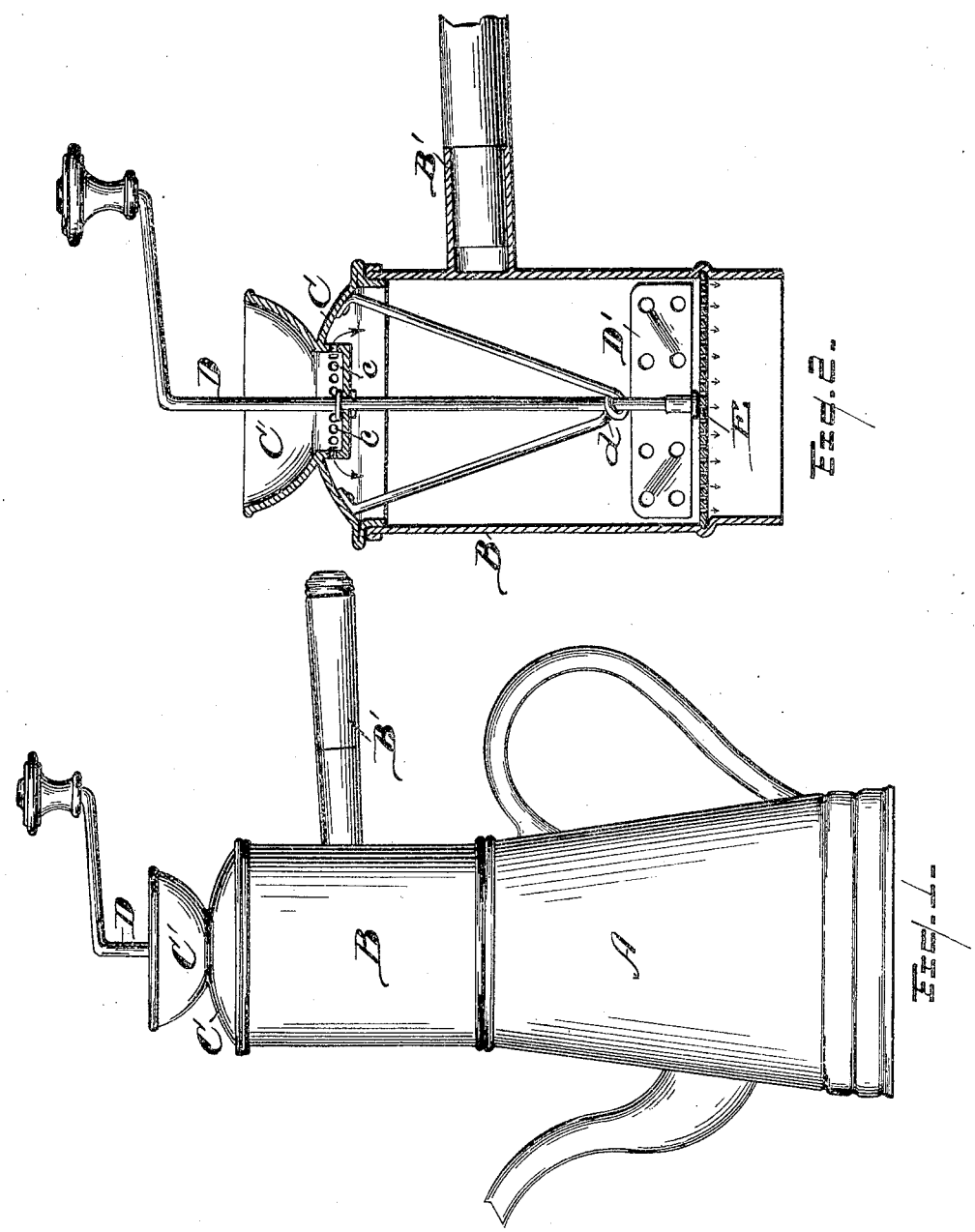

MARTIN M. DE GRODY, OF ST. LOUIS, MISSOURI.

COFFEE-POT.

No. 808,730.    Specification of Letters Patent.    Patented Jan. 2, 1906.

Application filed March 27, 1905. Serial No. 252,113.

*To all whom it may concern:*

Be it known that I, MARTIN M. DE GRODY, a citizen of the United States, residing at St. Louis, State of Missouri, have invented a certain new and useful Improvement in Coffee-Pots; and I declare the following to be a full, clear, and exact description of the invention, such as will enable others skilled in the art to which it pertains to make and use the same, reference being had to the accompanying drawings, which form a part of this specification.

My invention relates to an improvement in coffee-pots, shown in the accompanying drawings, and more particularly pointed out in the claim.

In the drawings, Figure 1 is a side elevation of the coffee-pot. Fig. 2 is a vertical central section through the upper portion of the same.

The object of my invention is to provide means whereby all the flavor or strength of the coffee used can be extracted, thereby effecting a saving in the amount of coffee usually employed to supply the demands of a given number of persons.

Referring to the letters of reference shown on the drawings, A represents the body or lower section of the coffee-pot, which is of ordinary form.

B is the upper section, partially sleeved within and resting on the lower section and provided with a suitable handle B'.

C is the cover, provided with a funnel C'.

D is the crank-shaft, journaled in the neck of the funnel, which is closed at the bottom, and in the depending bearing $d$, soldered to the cover C.

D' represents a series of blades secured to the crank-shaft, which are preferably inclined at an angle and perforated.

E is a screen located directly below the blades and secured to the walls of the upper section B.

As shown in the drawings, the neck of the funnel is provided with a series of perforations $c$, or a fine screen may be employed, if desired, the object of which will hereinafter be explained.

The operation of my invention is as follows: The upper section B is placed in position on the coffee-pot A and the cover removed for the reception of the ground coffee. The cover, with the stirring-blades attached, is then placed in position and boiling water is slowly poured into the funnel, the crank being occasionally rotated to insure the water coming in contact with all of the ground coffee-berries. This agitation of the mass while the hot water is being poured upon it secures the extraction of all the juice contained in the coffee-berry. As it is desirable to pour the water slowly upon the ground coffee, I have provided the funnel with small perforations, making it necessary to deliver only a small quantity of water at a time into the funnel. The boiling water at once extracts the juice from the coffee-berries, and the fluid is delivered into the lower section A of the coffee-pot through the screen E. By thus constantly agitating the mass of ground coffee while the boiling water is poured upon it I am enabled to secure all or practically all the juices contained in the coffee, thereby effecting a great saving in the quantity heretofore required to supply the demands of a given number of people.

Having thus described my invention, what I claim is—

In a coffee-pot, an upper removable section, a screen located within and adjacent to its lower edge, a removable cover provided with a funnel having a plurality of contracted openings discharging into said upper section, and stirring-blades located within said upper section and supported from said removable cover, said stirring-blades operated by a suitable crank-arm, substantially as described.

In testimony whereof I sign this specification in the presence of two witnesses.

MARTIN M. DE GRODY.

Witnesses:
JAMES E. BAKER,
HENRY WEBSTER.